United States Patent
Youn et al.

(10) Patent No.: US 10,044,317 B2
(45) Date of Patent: Aug. 7, 2018

(54) SYSTEM AND METHOD FOR CONTROLLING SWITCHING FREQUENCY

(71) Applicant: Hyundai Motor Company, Seoul (KR)

(72) Inventors: Kil Young Youn, Gyeonggi-do (KR); Gu Bae Kang, Yongin-si (KR); Jae Sang Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/358,302

(22) Filed: Nov. 22, 2016

(65) Prior Publication Data
US 2018/0054153 A1    Feb. 22, 2018

(30) Foreign Application Priority Data

Aug. 22, 2016 (KR) .................. 10-2016-0106267

(51) Int. Cl.
| | | |
|---|---|---|
| *H02P 1/04* | (2006.01) | |
| *B60L 9/00* | (2006.01) | |
| *H02P 29/68* | (2016.01) | |
| *B60L 11/18* | (2006.01) | |
| *B60K 1/00* | (2006.01) | |
| *H02P 6/10* | (2006.01) | |
| *B60K 1/04* | (2006.01) | |

(52) U.S. Cl.
CPC ............ *H02P 29/68* (2016.02); *B60K 1/00* (2013.01); *B60L 11/1803* (2013.01); *H02P 6/10* (2013.01); *B60K 1/04* (2013.01); *B60K 2001/006* (2013.01)

(58) Field of Classification Search
None
See application file for complete search history.

(56) References Cited

U.S. PATENT DOCUMENTS

| | | | |
|---|---|---|---|
| 7,245,094 B2 | 7/2007 | Shinmura et al. | |
| 9,511,647 B2 * | 12/2016 | Nishikawa | ......... B60H 1/00885 |
| 2007/0114965 A1 | 5/2007 | Kutsuna et al. | |
| 2010/0100266 A1 * | 4/2010 | Yoshinori | ................ B60K 1/04 701/22 |
| 2011/0193506 A1 | 8/2011 | Hayashi et al. | |
| 2014/0239861 A1 | 8/2014 | Ajima et al. | |
| 2015/0108929 A1 | 4/2015 | Nobe et al. | |

FOREIGN PATENT DOCUMENTS

| | | |
|---|---|---|
| JP | 2004-135465 A | 4/2004 |
| JP | 2005-150706 A | 6/2005 |
| JP | 2009-171641 A | 7/2009 |
| JP | 2010/246207 A | 10/2010 |
| JP | 2013-059159 A | 3/2013 |
| JP | 2015-080343 A | 4/2015 |
| JP | 2016-140122 A | 8/2016 |

\* cited by examiner

*Primary Examiner* — Bentsu Ro
*Assistant Examiner* — Zemenay Truneh
(74) *Attorney, Agent, or Firm* — Mintz Levin Cohn Ferris Glovsky and Popeo, P.C.; Peter F. Corless

(57) ABSTRACT

A method and system for controlling a switching frequency of a vehicle are provided. The method includes monitoring, by a controller of the vehicle, a temperature of a motor, a temperature of a coolant, and a quantity of a coolant when a vehicle engine is turned on. Additionally a switching frequency of an inverter is adjusted based on the monitored temperature of the motor, the monitored temperature of the coolant, and the monitored quantity of the coolant.

8 Claims, 6 Drawing Sheets

|  | MOTOR TEMPERATURE | | |
|---|---|---|---|
|  | <50℃ | ≥50℃ | ≥100℃ |
| COOLANT TEMPERATURE <40℃ | 10kHZ | 8kHZ | 6kHZ |
| COOLANT TEMPERATURE ≥40℃ | 8kHZ | 8kHZ | 6kHZ |
| COOLANT TEMPERATURE ≥60℃ | 6kHZ | 6kHZ | 6kHZ |

FIG. 3

SYSTEM AND METHOD FOR CONTROLLING SWITCHING FREQUENCY

CROSS-REFERENCE TO RELATED APPLICATION

This application is based on and claims the benefit of priority to Korean Patent Application No. 10-2016-0106267, filed on Aug. 22, 2016, in the Korean Intellectual Property Office, the disclosure of which is incorporated herein in its entirety by reference.

BACKGROUND

Field of the Disclosure

The present disclosure relates to a method and system for controlling a switching frequency, and more particularly, to a technique of securing an output and reducing noise by adjusting a switching frequency of an inverter while a vehicle is being driven.

Description of the Related Art

Generally, an inverter is a circuit configured to convert direct current (DC) power transferred from a battery (e.g., a solar battery array or the like) into a usable alternating current (AC) voltage using a switching circuit. Recently, development of high speed switching devices (e.g., an insulated gate bipolar mode transistor (IGBT) or the like) a switching frequency of a voltage type pulse width modulation (PWM) inverter has been increased to provide improved operational characteristics. However, a load of an induction motor, driven by a PWM inverter requires a high switching frequency to obtain a voltage and a current of a sine wave and a voltage and a current are rapidly adjusted every time a switching operation is performed. In other words, since a voltage and a current are significantly changed at every switching operation, a considerable amount of high frequency leakage current is generated.

In particular, a related art grid-connected inverter that reduces a leakage current is configured to use four switching elements in an inverter component. However, in the related art grid-connected inverter, when electric power is transmitted, a current passage is formed through several switching elements to increase loss. In addition, a rapid change in a voltage and a current each time a switching operation is performed in a switching element also increases a leakage current. In particular, a switching element of an inverter mounted within an electric vehicle or a hybrid vehicle is configured to generate switching noise based on a switching frequency, and here, a low switching frequency is advantageous due to loss in a switching operation. However, in an audio frequency range of a driving environment of a user or a driver or in a vehicle in which noise is generated a high switching frequency is advantageous to reduce noise.

The above information disclosed in this section is merely for enhancement of understanding of the background of the disclosure and therefore it may contain information that does not form the prior art that is already known in this country to a person of ordinary skill in the art.

SUMMARY

The present disclosure provides a method for adjusting a switching frequency. In particular, vehicle power may be secured and noise may be reduced by adjusting a switching frequency to a high frequency during normal driving and adjusting the switching frequency to a middle frequency or a low frequency when an inverter is excessively used or in a high temperature area by monitoring a temperature of a motor, a temperature of a coolant, and a quantity of a coolant affecting loss of a switching frequency of the inverter when the vehicle is being driven.

According to an exemplary embodiment of the present disclosure, a method for controlling a switching frequency may include monitoring, by a controller of the vehicle, a temperature of a motor, a temperature of a coolant, and a quantity of a coolant when a vehicle engine is turned on and adjusting by a controller a switching frequency of an inverter according to the monitored temperature of the motor, the monitored temperature of the coolant, and the monitored quantity of the coolant.

The method may further include comparing, by the controller of the vehicle, the temperature of the motor with a set first motor temperature; when the temperature of the motor is greater than the set first motor temperature comparing the temperature of the motor with a set second motor temperature. When the temperature of the motor is greater than the set second motor temperature the switching frequency of the inverter may be set to a low frequency and the quantity of the coolant may be to a first coolant quantity. The method may further include comparing, by the controller of the vehicle, the temperature of the coolant with a first coolant temperature when the temperature of the motor is less than the set first motor temperature and setting, by the controller of the vehicle, the switching frequency to a high frequency and setting the quantity of the coolant to a third coolant quantity when the temperature of the coolant is less than the first coolant temperature.

The method may further include comparing, by the controller of the vehicle, the temperature of the coolant with a second coolant temperature when the temperature of the coolant is greater than the first coolant temperature and setting, by the controller of the vehicle, the switching frequency to a middle frequency and setting the quantity of the coolant to a second coolant quantity when the temperature of the coolant is less than the second coolant temperature. The method may further include setting, by the controller, the switching frequency to a low frequency and setting the quantity of the coolant to the first coolant quantity when the temperature of the coolant is greater than the second coolant temperature.

BRIEF DESCRIPTION OF THE DRAWINGS

The above and other objects, features and advantages of the present disclosure will be more apparent from the following detailed description taken in conjunction with the accompanying drawings.

FIG. 3 is an exemplary view illustrating a method for controlling a switching frequency of an inverter on the basis of motor temperatures and coolant temperatures according to an exemplary embodiment of the present disclosure;

DETAILED DESCRIPTION

Figure 1:
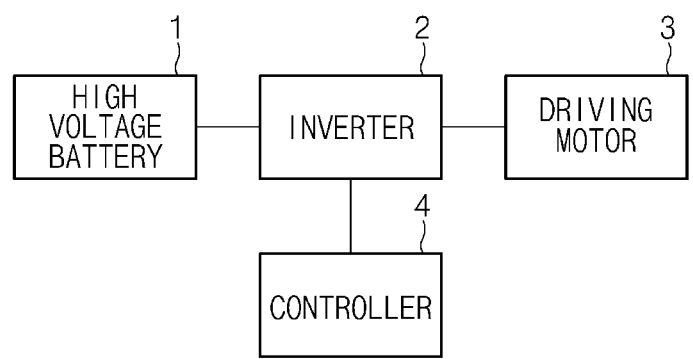
FIG. 1 is an exemplary block diagram of a system for controlling a switching frequency according to an exemplary embodiment of the present disclosure.

Advantages and features of the present disclosure, and implementation methods thereof will be described through exemplary embodiments described with reference to the accompanying drawings. The present disclosure may, however, be embodied in different forms and should not be construed as limited to the exemplary embodiments set forth herein. Rather, these exemplary embodiments are provided to describe the present disclosure so that a technical concept of the present disclosure may be easily practiced by those skilled in the art to which the present disclosure pertains. In the drawings, the exemplary embodiments of the present disclosure are not limited to a specific form and are exaggerated for clarity. The specific terms used in the present disclosure are merely used to describe the present disclosure, and are not intended to limit the scope of the present disclosure described in claims.

In the present disclosure, terms "and/or" include at least one of corresponding enumerated items. Also, terms "connected/coupled" include a direct connection with other component or an indirect connection through other component. In the present disclosure, the singular forms "a," "an" and "the" are intended to include the plural forms as well, unless the context clearly indicates otherwise. It will be further understood that the terms "comprises" and/or "comprising," when used in this specification, specify the presence or addition of stated components, steps, operations, or elements. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate, or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, an exemplary embodiment of the present disclosure will be described in detail with reference to the accompanying drawings.

FIG. 1 is an exemplary block diagram of a system for controlling a switching frequency according to an exemplary embodiment of the present disclosure. Referring to FIG. 1, a system for controlling a switching frequency may include a high voltage battery 1, an inverter 2, a motor 3, and a controller 4. The high voltage battery 1 refers to DC power used as main power of a vehicle. The inverter 2 may be connected to the high voltage battery 1, and may be configured to convert DC power provided from the high voltage battery 1 into AC power and provide the converted AC power to the motor (driving motor) 3. The controller 4 may be configured to monitor a temperature of the motor 3, a temperature of a coolant and a quantity of the coolant, and adjust a switching frequency of the inverter 2 based on the monitored temperature of the motor 3, the monitored temperature of the coolant, and the monitored quantity of the coolant.

Figure 2:
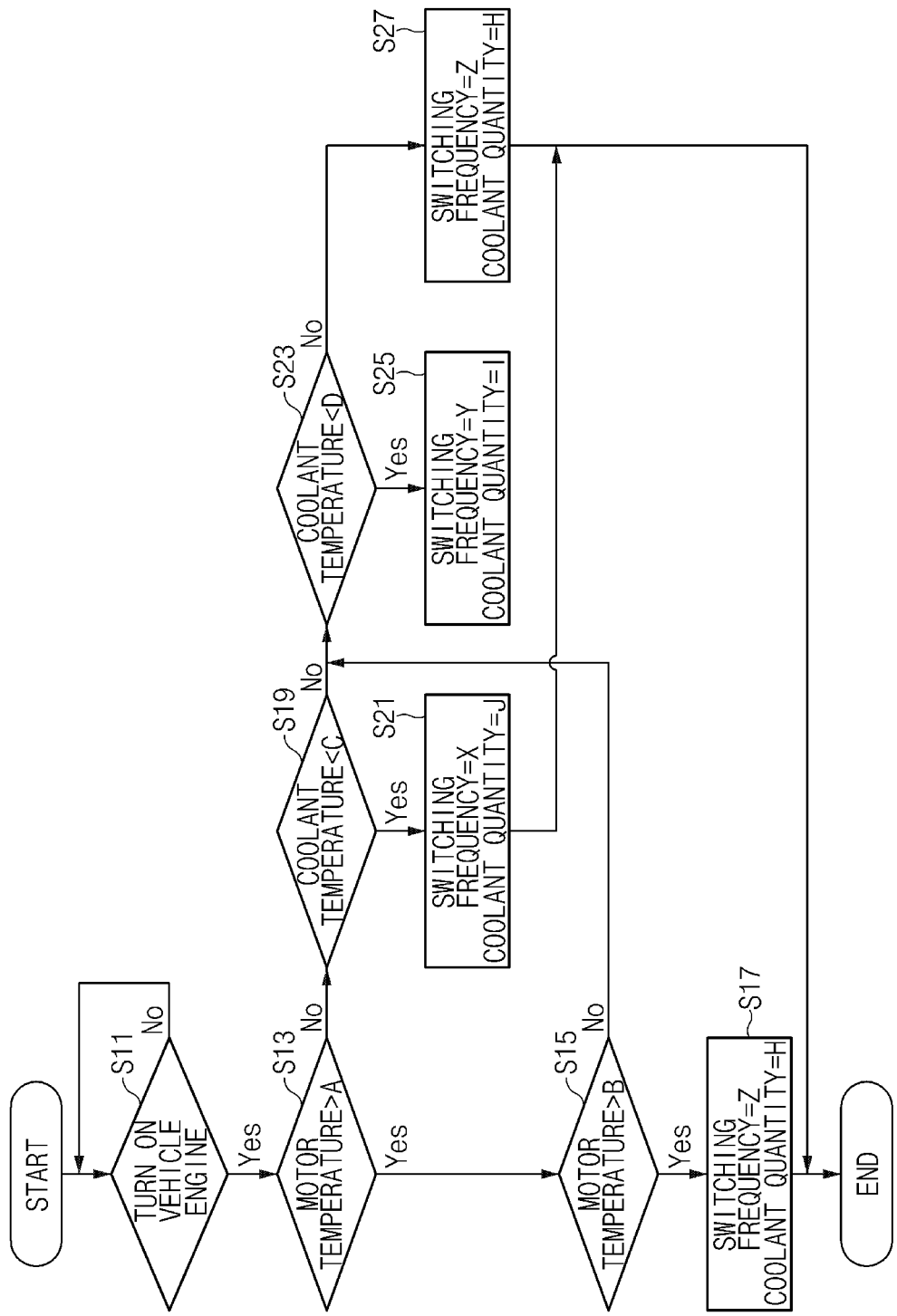
FIG. 2 is an exemplary flow chart illustrating a method for controlling a switching frequency according to an exemplary embodiment of the present disclosure.

FIG. 2 is an exemplary flow chart illustrating a method for controlling a switching frequency according to an exemplary embodiment of the present disclosure. A high voltage battery mounted within a vehicle may be configured to supply electric power for driving the motor 3 using the inverter. The inverter may be configured to convert DC power of a battery into AC power and supply the converted AC power to the motor. In particular, a set temperature of the motor, a set temperature of the coolant, and a set quantity of the coolant may be predetermined in a controller of a vehicle or may be reset by a driver or a user. Referring to FIG. 2, when a vehicle engine is turned on, the controller may be configured to compare a temperature of the motor with a first set motor temperature A S11 to S13.

When the temperature of the motor is greater than the first set motor temperature A, the controller of the vehicle may be configured to compare the temperature of the motor with a second set motor temperature B S15. When the temperature of the motor is greater than the second set motor temperature B, the controller of the vehicle may be configured to adjust a switching frequency of the inverter to a low frequency Z and adjust a quantity of coolant to a first coolant quantity H in S17. For example, the first motor temperature A may be less than the second motor temperature B, a first coolant temperature C may be less than a second coolant temperature D, and the first coolant quantity H may be greater than a second coolant quantity I, and the second coolant quantity I may be greater than a third coolant quantity J.

When the temperature of the motor is less than the first motor temperature A in operation S13, the controller may be configured to compare the temperature of the coolant with the first coolant temperature C S19. When the temperature of the coolant is less than the first coolant temperature C, the controller may be configured to adjust a switching frequency of the vehicle to a high frequency X and may be configured to adjust a quantity of the coolant to the third coolant quantity J S21. When the temperature of the coolant is greater than the first coolant temperature C S19, the controller may be configured to compare a temperature of the coolant with the second coolant temperature D S23.

When the temperature of the coolant is less than the second coolant temperature D of coolant, the controller may be configured to adjust the switching frequency to a middle frequency Y and may be configured to adjust the quantity of coolant to the second coolant quantity I S25. When the temperature of the coolant is greater than the second coolant temperature D S23, the controller may be configured to adjust the switching frequency to the low frequency Z and may be configured to adjust the quantity of coolant to the first coolant quantity H S27.

FIG. 3 is an exemplary view illustrating a method for controlling a switching frequency of an inverter based on the motor temperatures and coolant temperatures according to an exemplary embodiment of the present disclosure. An example of switching frequencies of the inverter adjusted according to a temperature of a motor and a temperature of a coolant will be described with reference to FIG. 3.

For example, it may be assumed that the first motor temperature A may be set to about 50° C., the second motor temperature B may be set to about 100° C., the first coolant temperature C may be set to about 40° C., and the second coolant temperature D may be set to about 60° C. In other words, when a current motor temperature of the vehicle is less than the first motor temperature A and a current coolant temperature of the vehicle is less than the first coolant temperature C, a switching frequency of the inverter of the vehicle may be adjusted to a high frequency X. When a current motor temperature of the vehicle is equal to or greater than the second motor temperature B and a current coolant temperature of the vehicle is less than the first coolant temperature C, a switching frequency of the inverter of the vehicle may be adjusted to a low frequency Z. When a current motor temperature of the vehicle is less than the first motor temperature A and a current coolant temperature of the vehicle is equal to or greater than the second coolant temperature D, a switching frequency of the inverter of the vehicle may be configured to be adjusted to a low frequency Z. When a current motor temperature of the vehicle is equal to or greater than the second motor temperature B and a current coolant temperature of the vehicle is equal to or greater than the second coolant temperature D, a switching frequency of the inverter of the vehicle may be adjusted to a low frequency Z.

Figure 4:
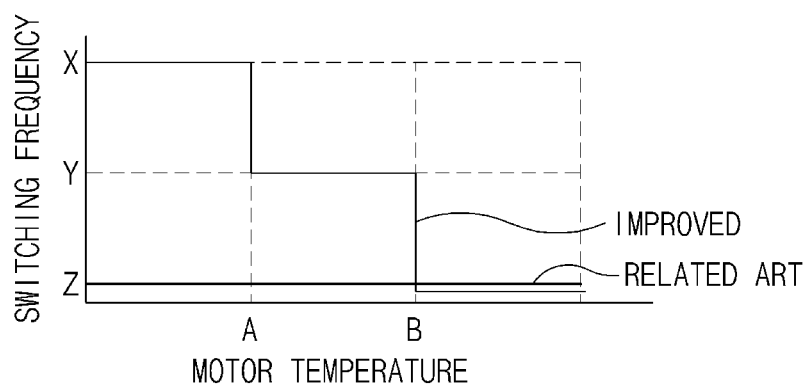
FIG. 4 is an exemplary graph illustrating a relation between a motor temperature and a switching frequency according to an exemplary embodiment of the present disclosure.

FIG. 4 is an exemplary graph illustrating a relationship between a motor temperature and a switching frequency according to an exemplary embodiment of the present disclosure. Referring to FIG. 4, when a temperature of the motor mounted within the vehicle is increased, magnetic flux may be reduced, and thus, an applied current may be increased. The increased current increases loss of the switching frequency of the inverter to reduce vehicle power. As illustrated in FIG. 4, the switching frequency may be configured to be adjusted to the high frequency X when a motor temperature is less than the first motor temperature A, may be adjusted to the middle frequency Y when a motor temperature is equal to or greater than the first temperature A, and may be adjusted to the low frequency Z when a motor temperature is equal to or greater than the second temperature B. Further, noise generation of the vehicle may be delayed to a maximum level based on a temperature of the motor, while vehicle power is continuously secured.

Figure 5:
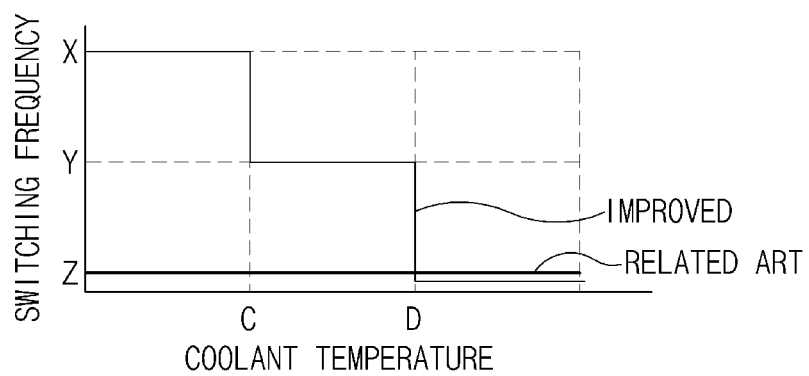
FIG. 5 is an exemplary graph illustrating a relation between a coolant temperature and a switching frequency according to an exemplary embodiment of the present disclosure.

FIG. 5 is an exemplary graph illustrating a relation between a coolant temperature and a switching frequency according to an exemplary embodiment of the present disclosure. Referring to FIG. 5, a coolant temperature of a vehicle is an important factors in variably adjusting a switching frequency of an inverter. In particular, when the vehicle is driving on public streets, a switching frequency of the inverter of the vehicle may be configured to be adjusted to the high frequency X, except for a high temperature (e.g., heat damage) area. As illustrated in FIG. 5, a switching frequency of the inverter of the vehicle may be adjusted to the high frequency X when a coolant temperature of the vehicle is less than the first coolant temperature C, may be adjusted to the middle frequency Y when a coolant temperature of the vehicle is equal to or greater than the first coolant temperature C, and may be adjusted to the low frequency Z when a coolant temperature of the vehicle is equal to or greater than the second coolant temperature D. Further, noise generation of the vehicle may be delayed to a maximum level based on a temperature of the motor, while vehicle power is continuously secured.

Figure 6:
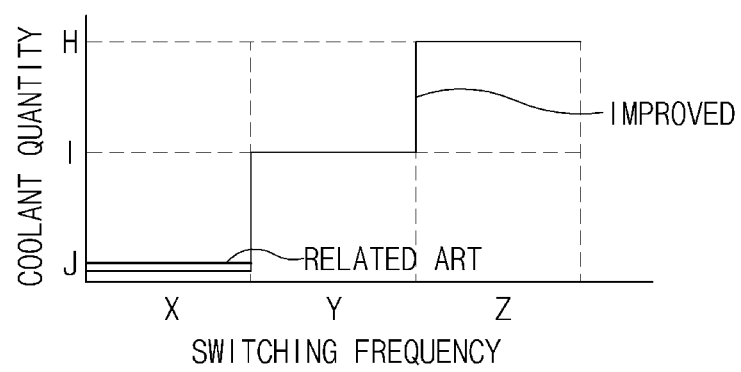
FIG. 6 is an exemplary graph illustrating a relation between a coolant quantity and a switching frequency according to an exemplary embodiment of the present disclosure.

FIG. 6 is an exemplary graph illustrating a relation between a coolant quantity and a switching frequency according to an exemplary embodiment of the present disclosure. Referring to FIG. 6, when a coolant quantity of a vehicle is increased, a motor temperature, a coolant temperature, and the like, may be reduced. Thus, when a switching frequency of the inverter of the vehicle is reduced, the coolant quantity may be increased to lower a temperature of each component of the vehicle and may be configured to adjust the switching frequency of the inverter of the vehicle to a high frequency again.

As described above, the technique of the present disclosure provides maximum vehicle power and reduces noise generated in the inverter, by variably adjusting a switching frequency of the inverter. In addition, the technique of the present disclosure may be configured to adjust the switching frequency to a high frequency when a vehicle is normally driving, and may be configured to adjust the switching frequency to a middle frequency or a low frequency when the inverter is excessively used or in a high temperature area.

The method for handling vehicle deviations according to various exemplary embodiments may also be created as a computer program. In addition, the program may be stored in a computer-readable recording medium (an information storage medium) and read and executed by a computer to implement the method of the present disclosure. The recording medium includes any type of recording medium that can be read by a computer.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A method for controlling a switching frequency, comprising:

monitoring, by a controller of a vehicle, a temperature of a motor, a temperature of a coolant, and a quantity of a coolant when a vehicle engine is turned on; and
adjusting by the controller, a switching frequency of an inverter based on the monitored temperature of the motor, the monitored temperature of the coolant, and the monitored quantity of the coolant,
wherein monitoring the temperature of the motor includes:
  comparing, by the controller, the temperature of the motor with a set first motor temperature: and
  comparing, by the controller, the temperature of the motor with a set second motor temperature when the temperature of the motor is greater than the set first motor temperature, and
wherein adjusting the switching frequency of the inverter includes:
  setting, by the controller, the switching frequency of the inverter to a low frequency and setting the quantity of the coolant to a first coolant quantity when the temperature of the motor is greater than the set second motor temperature.

2. The method according to claim 1, further comprising:
comparing, by the controller, the temperature of the coolant with a first coolant temperature when the temperature of the motor is less than a set first motor temperature; and
setting, by the controller, the switching frequency to a high frequency and setting the quantity of the coolant to a third coolant quantity when the temperature of the coolant is less than the first coolant temperature.

3. The method according to claim 1, further comprising:
comparing, by the controller, the temperature of the coolant with a second coolant temperature when the temperature of the coolant is greater than a first coolant temperature; and
setting, by the controller, the switching frequency to a middle frequency and setting the quantity of the coolant to a second coolant quantity when the temperature of the coolant is less than a second coolant temperature.

4. The method according to claim 1, further comprising:
setting, by the controller of the vehicle, the switching frequency to a low frequency and setting the quantity of the coolant to a first coolant quantity when the temperature of the coolant is greater than a second coolant temperature.

5. A system for controlling a switching frequency, comprising:
a memory configured to store program instructions; and
a processor configured to execute the program instructions, the program instructions when executed configured to:
monitor a temperature of a motor, a temperature of a coolant, and a quantity of a coolant when a vehicle engine is turned on; and
adjust a switching frequency of an inverter based on the monitored temperature of the motor, the monitored temperature of the coolant, and the monitored quantity of the coolant,
wherein the processor is further configured to:
  compare the temperature of the motor with a set first motor temperature;
  compare the temperature of the motor with a set second motor temperature when the temperature of the motor is greater than the set first motor temperature; and
  set the switching frequency of the inverter to a low frequency and set the quantity of the coolant to a first coolant quantity when the temperature of the motor is greater than the set second motor temperature.

6. The system according to claim 5, wherein the processor is further configured to:
compare the temperature of the coolant with a first coolant temperature when the temperature of the motor is less than a set first motor temperature; and
set the switching frequency to a high frequency and setting the quantity of the coolant to a third coolant quantity when the temperature of the coolant is less than the first coolant temperature.

7. The system according to claim 5, wherein the processor is further configured to:
compare the temperature of the coolant with a second coolant temperature when the temperature of the coolant is greater than a first coolant temperature; and
set the switching frequency to a middle frequency and setting the quantity of the coolant to a second coolant quantity when the temperature of the coolant is less than a second coolant temperature.

8. The system according to claim 5, wherein the processor is further configured to:
set the switching frequency to a low frequency and setting the quantity of the coolant to a first coolant quantity when the temperature of the coolant is greater than a second coolant temperature.

* * * * *